US009250969B2

(12) United States Patent
Lagar-Cavilla et al.

(10) Patent No.: US 9,250,969 B2
(45) Date of Patent: Feb. 2, 2016

(54) TAGGING A COPY OF MEMORY OF A VIRTUAL MACHINE WITH INFORMATION FOR FETCHING OF RELEVANT PORTIONS OF THE MEMORY

(75) Inventors: Horacio Andres Lagar-Cavilla, Toronto (CA); Roy Bryant, Scarborough (CA); Matti Hiltunen, Morristown, NJ (US); Olga Irzak, Toronto (CA); Kaustubh Joshi, Scotch Plains, NJ (US); Adin Matthew Scannell, Toronto (CA); Alexey Tumanov, Richmond Hill (CA); Eyal de Lara, Toronto (CA)

(73) Assignees: AT&T Intellectual Property I, L.P., Atlanta, GA (US); The Governing Council of the University of Toronto, Toronto, Ontario (CA)

( * ) Notice: Subject to any disclaimer, the term of this patent is extended or adjusted under 35 U.S.C. 154(b) by 689 days.

(21) Appl. No.: 13/220,972

(22) Filed: Aug. 30, 2011

(65) Prior Publication Data
US 2013/0055252 A1 Feb. 28, 2013

(51) Int. Cl.
*G06F 9/46* (2006.01)
*G06F 12/06* (2006.01)
*G06F 9/50* (2006.01)

(52) U.S. Cl.
CPC ............ *G06F 9/5016* (2013.01); *G06F 9/5077* (2013.01)

(58) Field of Classification Search
None
See application file for complete search history.

(56) References Cited

U.S. PATENT DOCUMENTS

| 7,299,468 | B2 | 11/2007 | Casey et al. |
| 7,506,096 | B1 * | 3/2009 | Koryakin et al. ................. 711/6 |
| 7,730,486 | B2 | 6/2010 | Herington |
| 7,840,801 | B2 | 11/2010 | Berger et al. |
| 7,886,221 | B1 | 2/2011 | Underwood et al. |
| 7,987,262 | B2 | 7/2011 | Tung et al. |
| 8,561,183 | B2 * | 10/2013 | Muth et al. ....................... 726/22 |
| 8,601,201 | B2 * | 12/2013 | Scannell et al. .................. 711/6 |
| 2005/0160424 | A1 | 7/2005 | Broussard et al. |
| 2006/0184938 | A1 | 8/2006 | Mangold |
| 2008/0163210 | A1 | 7/2008 | Bowman et al. |
| 2008/0250213 | A1 * | 10/2008 | Holt ............................. 711/159 |
| 2010/0122248 | A1 | 5/2010 | Robinson et al. |
| 2011/0022695 | A1 | 1/2011 | Dalal et al. |

OTHER PUBLICATIONS

"Content-addressable storage," retrieved from Wikipedia on Jul. 20, 2011, 4 pages.
"Demand paging," retrieved from Wikipedia on Jul. 20, 2011, 2 pages.
"Instruction cycle," retrieved from Wikipedia on Jul. 22, 2011, 4 pages.
"Kernel (computing)," retrieved from Wikipedia on Jul. 20, 2011, 17 pages.
"Page Allocation and Deallocation," retrieved from the Linux Tutorial on Jul. 21, 2011, © 1996-1999, 3 pages.
(Continued)

*Primary Examiner* — Wissam Rashid
(74) *Attorney, Agent, or Firm* — Hartman & Citrin LLC

(57) ABSTRACT

Methods and apparatus are disclosed to provision virtual machine resources. An example method includes labeling a copy of memory associated with an established virtual machine with an execution status based on an architecture type associated with the copy, and constraining a fetch operation in response to a page fault to a labeled portion of the copy that matches an architecture type of a received processor instruction.

20 Claims, 12 Drawing Sheets

(56) References Cited

OTHER PUBLICATIONS

"Linux Page Tables" retrieved from the Linux Tutorial on Jul. 21, 2011, © 1996-1999, 2 pages.
"Managing Virtual Machine State," retrieved from Microsoft TechNet on Jul. 18, 2011, © 2011, 3 pages.
"NX bit," retrieved from Wikipedia on Jul. 20, 2011, 10 pages.
"About Desktop and Virtual Machine States," retrieved from http://wikis.sun.com on Jul. 18, 2011, © 2010, 2 pages.
"Page fault," retrieved from Wikipedia on Jul. 22, 2011, 3 pages.
"Page table," retrieved from Wikipedia on Jul. 20, 2011, 5 pages.
"Paging," retrieved from Wikipedia on Jul. 22, 2011, 10 pages.
Van Der Linden, Frank, "Porting NetBSD to the AMD x86-64:a case study in OS portability," Feb. 2002, 10 pages.
"Radix tree," retrieved from Wikipedia on Jul. 20, 2011, 4 pages.
Open Systems Resources, Inc., "So What Is a Page Fault?" May 6, 2003, 1 page.
Standard Performance Evaluation Corporation, "SPEC Glossary," © 1995-2011, 13 pages.
Moguillansky et al., "Lecture 12-Virtual Memory I," 2006, 5 pages.
"User space," retrieved from Wikipedia on Jul. 20, 2011, 2 pages.
"Virtual Machine State Diagram," retrieved from http://msdn.microsoft.com on Jul. 18, 2011, ©2011, 2 pages.
"Virtual memory," retrieved from Wikipedia on Jul. 20, 2011, 6 pages.
Red Hat Enterprise Linux 3, "4.4. Virtual memory: The Details, Introduction to System Administration Chapter 4. Physical and Virtual Memory," retrieved from http:docs.redhat.com/docs/en-US/Red_Hat_Enterprises_Linux/3/3html. on Jul. 22, 2011, 3 pages.
"Chapter 1. First Steps," retrieved from httpll.www.virtualbox.org/manual/ch01.html. on Jul. 18, 2011, 20 pages.

\* cited by examiner

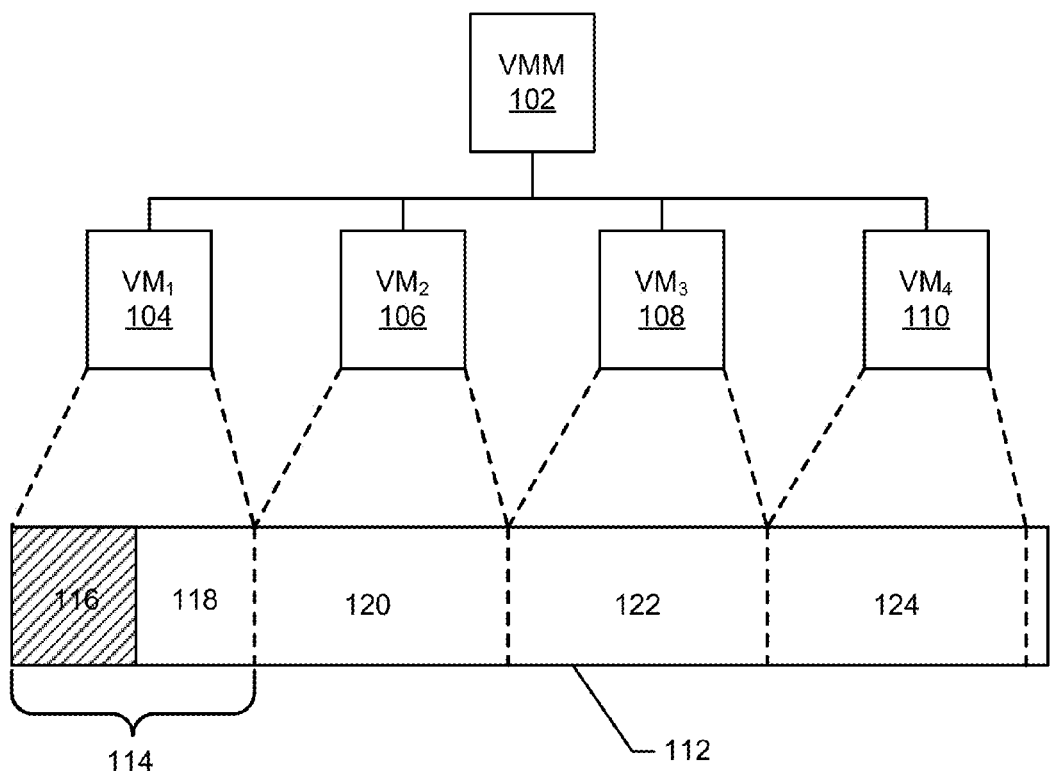
FIG. 1A – PRIOR ART

TAGGING A COPY OF MEMORY OF A VIRTUAL MACHINE WITH INFORMATION FOR FETCHING OF RELEVANT PORTIONS OF THE MEMORY

FIELD OF THE DISCLOSURE

This disclosure relates generally to cloud computing, and, more particularly, to methods and apparatus to provision virtual machine resources.

BACKGROUND

In recent years, cloud computing services have been developed and deployed that allow customers to utilize computing resources without making capital expenditures to acquire such computing resources. Typically, a cloud computing service provider configures one or more computers and/or computer systems having at least one processor, memory storage and network access to the one or more computers and/or computer systems. These cloud computer systems may include any number of processors, memories and/or network access devices (e.g., network interface card(s) (NICs)) to allow any number of customers access to services provided by the computer systems. Services may include, but are not limited to, numerical processing, commercial transaction processing and/or web hosting.

In some examples, the cloud computing service provider configures the computer systems with one or more virtual machines (VMs) to service the one or more customers' computing needs. Generally speaking, VMs are virtual instances of an operating system that execute on underlying hardware resources in a time-sliced manner. A VM user is provided with computing services, such as an operating system user interface, storage space and/or applications (e.g., database query engines, numerical processing applications, graphical processing applications, web server applications, etc.) that are logically separated from any other instantiated VMs operating on the underlying hardware resources managed by the cloud computing service provider.

BRIEF DESCRIPTION OF THE DRAWINGS

FIG. 1A is a schematic illustration of an example virtual machine allocation system.

DETAILED DESCRIPTION

Figure 1B:
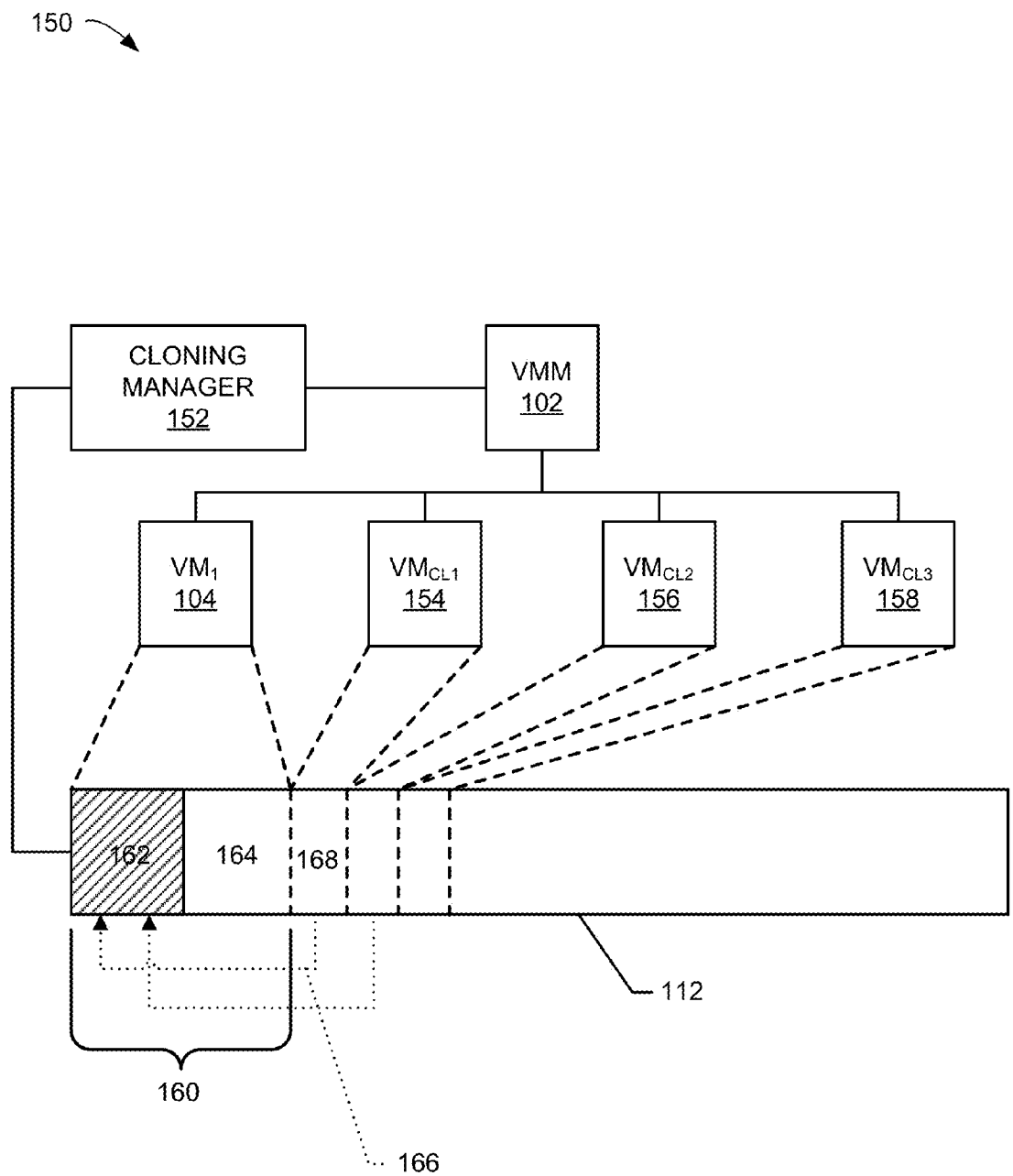
FIG. 1B is a schematic illustration of an example virtual machine allocation system to provision virtual machine clones.

Methods, apparatus, and articles of manufacture are disclosed, which includes labeling a copy of memory associated with an established virtual machine with an execution status based on an architecture type associated with the copy, and constraining a fetch operation in response to a page fault to a portion of the labeled copy that matches an architecture type of a received processor instruction.

Cloud-based resource services allow customers to avoid capital expenditure in computer hardware while obtaining the benefit of having such computer resources available for computing operation(s). At least one example of a cloud-based resource service provider is Amazon® Elastic Compute Cloud (EC2), which manages network accessible computer resources for a fee. In some examples, fees charged by the cloud-based resource service provider are calculated based on a metric associated with processor utilization. In other examples, fees charged by the cloud-based resource service provider are calculated as a flat fee associated with an amount of time (e.g., minutes, hours, days, weeks, months).

Computing resources managed by the cloud-based resource service provider typically include high-end server machines having multiple processors and/or processors having multiple cores. The example computing resources managed by the cloud-based resource service provider are typically virtualized, in which a virtual machine manager (VMM) creates one or more virtual machines (VMs) that are logically separate from any other VMs instantiated by the VMM. In other words, although each VM shares underlying hardware resources on a time-slice basis, the allocated processes, memory and/or storage space of one VM are not accessible by any other VM executing on the underlying hardware resources.

Cloud computing services cater to customer workloads that may change abruptly from relatively minimal resource requirements (e.g., resource requirements measured in central processing unit (CPU) clock cycles) to more demanding resource requirements. For example, a website that hosts web-based e-mail accounts or news articles may experience peak demands around a lunch hour in response to employees checking their e-mail accounts and/or looking for news updates during their lunch break time. After the lunch break time, demand for such services may drop substantially until evening hours when such employees return to their homes. Additionally, the rate at which demand increases may occur faster than a VMM and corresponding hardware can respond.

For example, while cloud servers grow (e.g., adding VMs when demand increases) and shrink (e.g., removing VMs when no longer needed) in response to user demands, unpredictable and/or lengthy latency may occur when attempting to add additional VMs. In some examples, bandwidth intensive input/output activity, memory allocation and/or VM state replication result in VM instantiation latencies of approximately two minutes, as described by H. Andres Lagar-Cavilla et al. ("Kaleidoscope: Cloud Micro-Elasticity via VM State Coloring," Eurosys, Apr. 10-13, 2011), the entire disclosure of which is incorporated by reference herein in its entirety. User demands are not satisfied until the one or more VMs are ready to execute. Cloud service providers fear, in part, lost revenue due to lethargic service performance and/or user experiences in which service requests consume excessive amounts of time to complete (e.g., web-page request timeout). For example, on-line advertisements that would otherwise accompany web-based services may never appear if the one or more VMs are not operational and/or delayed due to instantiation latencies.

To ensure and/or otherwise promote a responsive user experience, cloud service providers facilitate the instantiation of VMs prior to detecting one or more peaks in user demand for services. In some instances, the cloud service providers enable and/or otherwise allow tools (e.g., Amazon EC2 Autoscale, Beanstalks, RightScale, etc.) to allow VM instantiation. For example, cloud service providers may instantiate (e.g., via user-tuned tools) a number of VMs fifteen minutes before a lunch break time in anticipation of an increase in user demand. In other examples, the cloud service providers may monitor (e.g., via the aforementioned tools) a performance demand threshold value (e.g., 30% of the highest demand observed to date) and allocate VMs to accommodate for the demand threshold value plus a margin of safety above the current demand. In operation, if the currently observed demand is 30% of the highest demand ever observed, then the cloud service provider may allocate a number of VMs to accommodate 70% of the highest demand observed to date. In other words, a 40% increase in resources are allocated to additional VMs to accommodate for the possibility that demand will increase. As long as the cloud service provider allocates a number of VMs that always exceed an amount needed for current demand, users are more likely to experience services that are satisfactory.

While any number of additional VMs and corresponding hardware for the additional VMs may be allocated to ensure a satisfactory user experience, such resources are consumed regardless of whether demand increases or not. As such, some of the underlying hardware resources for each of the additional VMs are wasted rather than allocated to one or more computing processes in response to actual user requests. Additionally, some VMs are only needed for relatively short periods of time (e.g., 10 seconds) and then relinquished so that the underlying hardware resources may be allocated for other VMs, as needed. In such example circumstances, approximately two minutes of instantiation time are required to prepare a VM that is to operate for only ten seconds, resulting in substantial waste of the underlying hardware resources and substantial delay before the VM can be used. Capital investment increases due to one or more attempts by the cloud service provider to keep customers satisfied with a responsive experience. Such capital investment costs may be ultimately passed on to users, thereby affecting the competitive edge for the cloud service provider.

Methods, systems, apparatus and/or articles of manufacture disclosed herein provision VMs in a focused manner that is responsive to user demand, rather than provisioning resource heavy VMs prior to actual user demands being detected. Such on-the-fly VM provisioning reduces or even minimizes wasted resources of the underlying hardware. Additionally, methods, systems, apparatus and/or articles of manufacture disclosed herein identify one or more memory regions of a parent VM (e.g., a previously established VM) to facilitate memory resource sharing between cloned child VMs so that each child VM consumes a smaller footprint of memory resources. As each child VM consumes a smaller portion of memory resources, a greater number of child VMs may be implemented for a given hardware resource platform.

FIG. 1A is a schematic illustration of an example VM allocation system 100 that allocates VMs for use by one or more customers in a cloud computing environment. A customer may include, but is not limited to, a service provider of cloud-based (e.g., Internet) services for any number of users (e.g., subscribers) and/or a customer/subscriber of such a service provider. In the illustrated example of FIG. 1A, the VM allocation system 100 includes a virtual machine manager (VMM) 102, a first VM 104 (VM$_1$), a second VM 106 (VM$_2$), a third VM 108 (VM$_3$), and a fourth VM 110 (VM$_4$). The example first VM 104 (VM$_1$) of FIG. 1A is instantiated as a parent VM to service user requests, such as requests to serve pages, run queries and/or any other computing function invoked via a cloud-based network and/or invoked via one or more interfaces to the hardware resources provided by the entity managing the VMs.

Each instantiated VM is allocated a portion of underlying hardware resources of a computer system, such as random access memory (RAM) 112. While the illustrated example of FIG. 1A includes RAM 112 as an example type of underlying hardware resource to be used by VMs, the RAM 112 is included for purposes of discussion and not limitation. Generally speaking, VMs may have access to memory (e.g., the RAM 112 of FIG. 1A), disk storage (e.g., hard drive(s), optical disk(s), etc.), processor(s) (e.g., central processing unit(s) (CPUs), multi-core CPUs, etc.), databases, and/or networking device(s) (e.g., routers, switches, etc.).

In response to user demand, the example VMM 102 instantiates the parent VM 104 (VM$_1$), which consumes a first portion 114 of RAM 112. Although a first portion 114 of RAM 112 is allocated for exclusive use by VM$_1$, the whole first portion 114 may not be in active use by VM$_1$ 104. In the illustrated example of FIG. 1A, a first sub-portion 116 of the first portion is being used by VM$_1$, while a second sub-portion 118 is reserved for a possibility of future use (e.g., storage space for data operation(s) performed by VM$_1$). Even though additional VMs may not be needed at a first time to meet demand, the example VMM 102 also instantiates child VMs (e.g., VM$_2$ 106, VM$_3$ 108, VM$_4$ 110) in case user demand increases at a future time/date. Each additional VM instantiated by the example VMM 102 consumes a corresponding portion of the RAM 112. For example, VM$_2$ 106 is allocated a second portion 120 of RAM 112, VM$_3$ 108 is allocated a third portion 122 of RAM 112, and VM$_4$ 110 is allocated a fourth portion 124 of RAM 112. In some circumstances, VM$_2$ 106, VM$_3$ 108 and/or VM$_4$ 110 sit idle waiting for a possibility of invocation in response to user demand, which may never occur. Additionally, the portions of RAM 112 corresponding to the instantiated VMs remain unused and inaccessible.

FIG. 1B is a schematic illustration of an example VM allocation system 150 constructed in accordance with the teaching of this disclosure to provision VM clones (also referred to herein as clone VMs) in response to user demands for computing functionality. In the illustrated example of FIG. 1B, the VMM 102, VM$_1$ 104 and RAM 112 are substantially similar to corresponding elements described in connection with FIG. 1A, and will not be further described in connection with FIG. 1B. Such like elements are numbered with like reference numbers. The example cloning manager 152 of FIG. 1B invokes the example VMM 102 to generate a first clone VM 154 (VM$_{CL1}$), a second clone VM 156 (VM$_{CL2}$), and a third clone VM 158 (VM$_{CL3}$). Unlike an instantiated VM, which may copy memory pages from disk to be stored in physical memory of the underlying hardware (e.g., RAM 112), a cloned VM includes a data structure or container populated with metadata related to a parent VM. The container includes information related to the CPU state of the parent VM, as well as information related to address locations of physical memory associated with the parent VM. As used herein, the state of a VM includes, but is not limited to, virtual device specifications, architectural data structures (e.g., page tables, segment descriptors) and/or virtual CPU register information.

A benefit of cloning a VM rather than instantiating a new VM is a decrease in an amount of time required before the cloned VM is handling user task(s). Generally speaking, instantiating a VM includes allocating a portion of RAM for use by the VM, accessing disk storage to retrieve pages and populate the allocated RAM with the pages associated with one or more instructions of interest, and handling page faults.

Page faults may include any number of iterations of retrieving a page from disk storage, checking the retrieved page to confirm it is associated with the CPU instruction, determining the retrieved page is not correct, and re-retrieving a different page from disk storage. Additionally, the instantiation process for the VM changes states when invoking a fault handler to process one or more page faults.

Once a parent VM (an established VM) is instantiated, its corresponding physical memory is typically populated in a robust manner. For example, if the parent VM is generally associated with one or more tasks related to online analytical process (OLAP), then the corresponding memory of the parent VM (e.g., a portion of RAM 112) includes relevant kernel code instructions, user code instructions, kernel data, user data and/or files associated with OLAP task(s). As such, while a cloned VM also experiences page faults (e.g., information unavailable to a requesting instruction), one or more fetch operation(s) occur to physical memory (e.g., RAM 112) rather than disk storage, thereby saving substantial time. However, each cloned VM does not copy all the pages of its corresponding parent, which would consume a greater amount of physical memory (e.g., RAM 112). Instead, the cloned VM container includes a limited amount of metadata state information related to the parent VM, such as a current CPU state (e.g., CPU register contents).

Methods, systems, apparatus and/or articles of manufacture disclosed herein employ the cloning manager 152 to evaluate, identify and/or label parent memory 160 of $VM_1$ 104. A first sub-portion 162 of the parent memory 160 of $VM_1$ 104 is currently used by $VM_1$ 104, and a second sub-portion 164 is free memory. In operation, the example cloning manager 152 accesses the parent memory 160 of the parent VM ($VM_1$) via the example VMM 102 and/or via direct access to the example physical memory 112. The evaluation of the parent memory 160 by the example cloning manager 152 identifies and/or otherwise classifies the memory 160 into sets of semantically-related regions to facilitate, in part, an optimized manner of fetching in response to a page fault. As used herein, memory coloring refers to labeling and/or otherwise tagging portions of memory (e.g., pages of memory) in a manner associated with their use. Semantically-related regions of memory 160 may include, but are not limited to kernel data, user data, kernel code, data code, files and/or free memory space.

In operation, the example cloning manager 152 of FIG. 1B allows the example VMM 102 to clone VMs with a smaller memory footprint. Further, generation of clones occur faster than traditional VMs that are instantiated. In the illustrated example of FIG. 1B, the example cloning manager 152 directs the VMM 102 to fetch one or more pages from the parent memory 160 that are relevant and/or otherwise associated with a CPU instruction of $VM_{CL1}$ 154. For example, if $VM_{CL1}$ 154 is also chartered with one or more OLAP kernel code task(s), then $VM_{CL1}$ 154 performs one or more fetching operations (in response to a page fault) on portions of the memory 160 that are associated with kernel code. As such, one or more fetching operations in response to a page fault do not waste time by fetching pages unrelated to kernel code memory location(s) (pages(s)). As used herein, a page is a discrete size of memory, such as a 4 kB portion of memory used by, for example, x86 architecture processors.

Additionally, because the parent $VM_1$ 104 has already performed a relatively time-consuming fetch to store one or more pages related to kernel code in the physical memory 112, memory 168 associated with $VM_{CL1}$ 154 does not need to consume space for such kernel code and/or time to repeat the retrieval. Instead, $VM_{CL1}$ 154 retrieves kernel code 166 from the first sub-portion 162, thereby reducing the amount of memory 168 associated with $VM_{CL1}$ 154 and the latency associated with facilitating duplicate copies of data and/or code. In another example, if $VM_{CL2}$ 156 attempts to execute an instruction associated with user code, a corresponding page fault fetch is limited to only such sections of the color mapped memory that are also associated with user code, thereby reducing and/or even minimizing a number of page fault iterations before finding the correct page(s).

Figure 2:
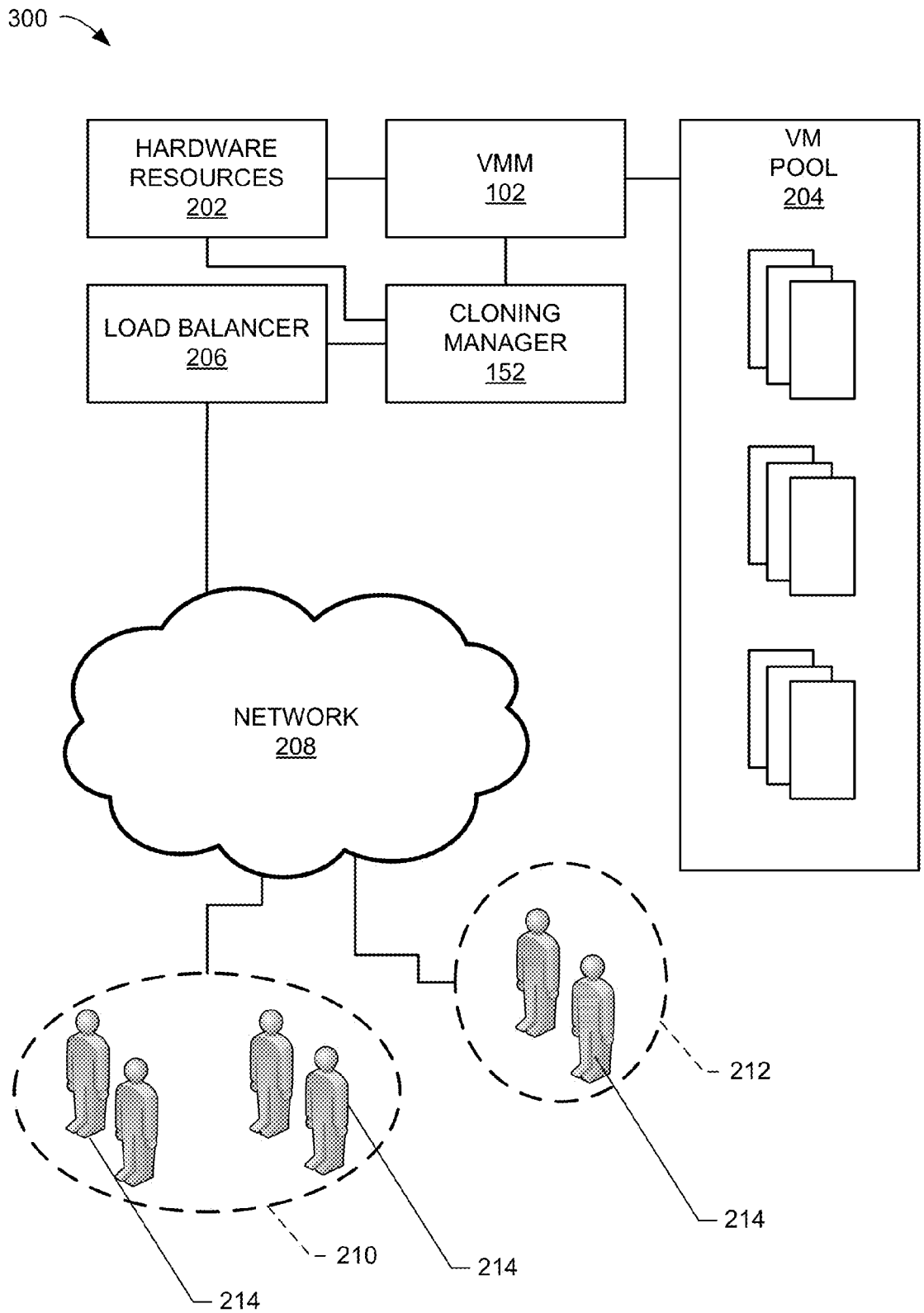
FIG. 2 is a schematic illustration of an example implementation of a cloning manager of the example system of FIG. 1B.

FIG. 2 is a schematic illustration of an example system 300 to provision virtual machine resources. In addition to the VMM 102 and the cloning manager 152 described above in connection with FIG. 1B, the illustrated example of FIG. 2 includes hardware resources 202, a VM pool 204, and a load balancer 206 communicatively coupled to a network 208. The example hardware resources 202 of FIG. 2 may include any number of CPUs, storage resources (e.g., hard disk drive(s), optical disk drive(s), flash disk drive(s), etc.) and/or any amount of memory, such as the example RAM 112 and/or nonvolatile memory. The illustrated example of FIG. 2 also includes a first customer 210 and a second customer 212, each of which may include any number of users 214. Although the illustrated example of FIG. 2 includes two customers, any number of customers may be serviced by example methods, apparatus, systems and/or articles of manufacture disclosed herein.

In operation, the example cloning manager 152 of FIG. 2 invokes the example VMM 102 to instantiate a parent VM, such as the example $VM_1$ 104 of FIG. 1B, which results in an established (running) VM. As described above, the parent VM performs a number of disk accesses to acquire and store pages to physical memory 112. The parent VM may allocate other hardware resources 202, such as one or more CPUs and/or other processors dedicated to the parent VM. The example parent VM may be generally associated with a type of task and/or operation including, but not limited to OLAP, banking, ecommerce, and/or web services. In the event one or more task(s) are deemed dissimilar, additional parent VMs may be instantiated, as desired. When the parent VM instantiation is complete and the resulting parent VM is fully loaded (e.g., pages acquired from disk and stored to physical memory) and operating (e.g., the parent VM in a running state), the example cloning manager 152 of FIG. 2 acquires a snapshot of the memory associated with the executing parent VM.

More specifically, information related to the parent VM memory architecture and/or operating system (OS) is retrieved and inspected to identify regions of physical memory that may be related to each other. For example, the cloning manager 152 of FIG. 2 may identify regions of physical memory associated with kernel data, user data, kernel code, user code, free space and/or files. Such related regions of physical memory are colored by the example cloning manager 152 to allow improved and/or even optimized fetching and/or resource allocation in response to an increase in demand via the example load balancer 206. One or more VM clones are generated by the example cloning manager 152 of FIG. 2 for each type of parent VM instantiated, in which the state of the parent VM is stored in a container (e.g., a metadata structure) for each VM clone.

In response to an increase in user demand, the example cloning manager 152 of FIG. 2 allocates the generated VM clone(s) to the requesting task(s). Each VM clone begins execution with a CPU instruction that prompts a fetch of physical memory for further information regarding how to complete the instruction. In some examples, the first CPU instruction causes a page fault because virtual memory associated with the VM clone does not contain the corresponding and/or otherwise correct page(s) to allow the CPU instruction to complete. In the event the page fault is associated with an instruction related to kernel code, the prior color mapping of the physical memory associated with the parent VM facilitates improved and/or even optimized matching of the instruction type with the memory page type, which allows one or more fetch operation(s) to be constrained to only those sections of physical memory associated with kernel code. Similarly, in the event the page fault is associated with an instruction related to kernel data, user code, or user data, the prior color mapping of the physical memory associated with the parent VM allows one or more fetch operation(s) to be constrained to those sections of physical memory associated with kernel data, user code, or user data, respectively.

Additionally, because some cloned VMs require amounts of memory to store and/or process data associated with particular task(s), each cloned VM may also be allotted its own physical memory. While a portion of the physical memory 112 may be associated with a cloned VM, the corresponding portion of the physical memory 112 is not allocated to the cloned VM if it is associated with static memory. Instead, pages of the physical memory 112 that are deemed static and/or common to the parent VM are pointed-to by the example cloning manager 152 so that physical memory storage space is not duplicated among the one or more cloned VMs. A benefit associated with consolidating static memory locations includes reducing a resource footprint for the cloned VMs, thereby allowing a greater number of VMs per unit of underlying hardware than would otherwise be possible via a traditional VM instantiation approach.

Figure 3:
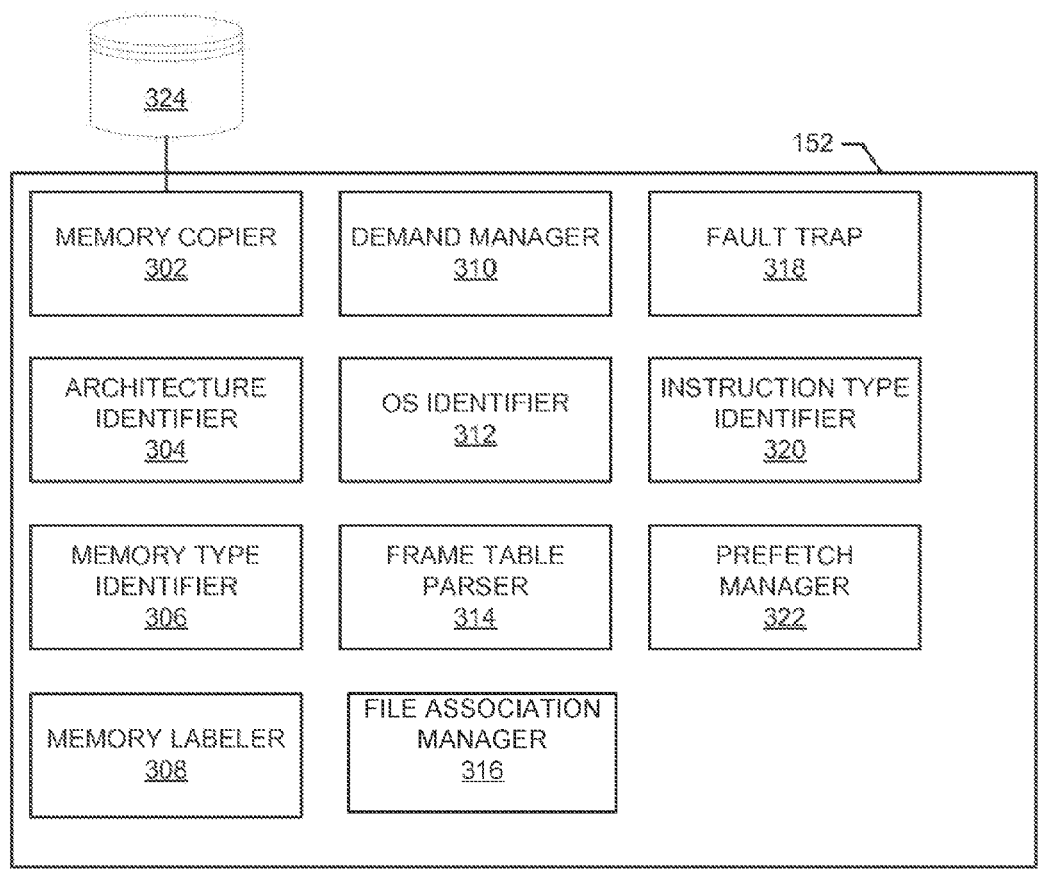
FIG. 3 is a schematic illustration of the example cloning manager of FIGS. 1B and 2.

FIG. 3 is a schematic illustration of an example implementation of the example cloning manager 152 of FIGS. 1B and 2. In the illustrated example of FIG. 3, the cloning manager 152 includes a memory copier 302, an architecture identifier 304, a memory type identifier 306, a memory labeler 308, a demand manager 310, an OS identifier 312, a frame table parser 314, a file association manager 316, a fault trap 318, an instruction type identifier 320, a prefetch manager 322, and a cloning data store 324. Some examples include means for capturing a copy of a portion of the physical memory (e.g., associated with the parent VM), means for identifying an architecture, means for identifying a type of memory, means for labeling memory, means for receiving and/or otherwise obtaining information from a load balancer, means for identifying an OS, means for parsing a frame table, means for identifying circumstances where allocated memory does not include corresponding information to allow an instruction to complete execution, means for identifying an instruction type, and means for constraining one or more fetch operations to portions of memory/pages that have been colored and/or otherwise identified as user data. In the illustrated example of FIG. 3, the means for capturing a copy of a portion of the physical memory (e.g., associated with the parent VM) is the example memory copier 302, means for identifying an architecture is the example architecture identifier 304, means for identifying a type of memory is the example memory type identifier 306, means for labeling memory is the example memory labeler 308, means for receiving and/or otherwise obtaining information from a load balancer is the example demand manager 310, means for identifying an OS is the example OS identifier 312, means for parsing a frame table is the example frame table parser 314, means for identifying circumstances where allocated memory does not include corresponding information to allow an instruction to complete execution is the example fault trap 318, means for identifying an instruction type is the example instruction type identifier 320, and/or means for constraining one or more fetch operations to portions of memory/pages that have been colored and/or otherwise identified as user data is the example prefetch manager 322. Each of the means for capturing a copy of a portion of the physical memory (e.g., associated with the parent VM), means for identifying an architecture, means for identifying a type of memory, means for labeling memory, means for receiving and/or otherwise obtaining information from a load balancer, means for identifying an OS, means for parsing a frame table, means for identifying circumstances where allocated memory does not include corresponding information to allow an instruction to complete execution, means for identifying an instruction type, and/or means for constraining one or more fetch operations to portions of memory/pages that have been colored and/or otherwise identified as user data may be implemented by the processor P100 of FIG. 11 executing the instructions of FIGS. 4-10.

In response to a parent VM completing instantiation, the example memory copier 302 obtains and/or otherwise captures a copy of at least a portion of the physical memory associated with the parent VM, such as a copy of the first sub-portion 162 used by parent VM$_1$ 104 of FIG. 1B. Pages of the captured memory from the parent VM may be stored in the example cloning data store 324, which may be implemented as any type of memory (e.g., hard disk drive, optical disk drive, flash memory, RAM, etc.). In some examples, the memory copier 302 captures the copy of at least a portion of the physical memory after a threshold settling time to ensure that the contents of the physical memory have been established to contain one or more portions of kernel data, user data, kernel code, user code, files and/or free space.

The example architecture identifier 304 of FIG. 3 analyzes, inspects and/or otherwise examines the metadata associated with the parent VM 104 to determine an architecture type associated with the CPU. VMs may execute on any type of processor architecture. Different types of processor architectures may include different types of instruction sets and/or status bit types that reveal useful information. For example, VMs may execute on x86 processors, ARM processors, 32-bit processors, 64-bit processors, etc. If the example architecture identifier 304 determines that the processor is an x86 architecture, then the example architecture identifier 304 invokes the example memory type identifier 306 to search for an NX status bit (e.g., a search of one or more page table(s)). An NX status bit, which is sometimes referred to as the "no execute" bit, identifies portion(s) of memory that store code versus portion(s) of memory that store data. In operation, if the memory type identifier 306 identifies that a page and/or other portion of memory is associated with or includes an indication of the NX status bit having a true value, then that particular page and/or portion of memory is non-executable code (i.e., data storage rather than executable code storage). On the other hand, if the memory type identifier 306 identifies that a page and/or other portion of memory is associated with the NX status bit having a false value, then that particular page and/or portion of memory is executable code (i.e., executable code storage rather than data storage). As described in further detail below, knowing whether a page is executable code or data facilitates memory consolidation efforts when cloning one or more VMs to reduce or even minimize its memory footprint.

In still other examples, if the example architecture identifier 304 determines that the processor is of type ARM, then the example architecture identifier 304 invokes the example memory type identifier 306 to search for an XN status bit. An XN status bit, which is sometimes referred to as the "execute never" bit, identifies portion(s) of memory that store code versus portion(s) of memory that store data. In operation, portion(s) of memory and/or pages in which the XN status bit is true are deemed to be associated with code, while portion(s) of memory and/or pages in which the XN status bit is false are deemed to be associated with data. While the example architecture identifier 304 is described as identifying x86 and/or ARM-based processors, the methods, apparatus, systems and/or articles of manufacture disclosed herein are not limited thereto. Additionally, while the example memory type identifier 306 is described as identifying an NX and/or and XN status bit, such example bit types are included for purposes of discussion and not limitation. For instance, processors and their associated pages also include a user bit, which identifies whether the pages correspond to user related data or kernel related data. Such user bit may additionally or alternatively be used with the NX, XN, or any other status bit.

If the example memory type identifier 306 determines that memory is non-executable (e.g., the NX or XN status bit is true), then the memory type identifier 306 determines an ownership status (e.g., a user indicator) of the non-executable pages, such as whether the pages are associated with user space or kernel space. The example memory labeler 308 of FIG. 3 colors and/or otherwise labels the page as type "non-executable user space" (e.g., in the case of user ownership) or "kernel space" (e.g., in the case of kernel ownership) and stores such labels in the example cloning storage 324 for later referral. On the other hand, if the example memory type identifier 306 determines that memory is executable (e.g., the NX or XN status bit is false), then the memory type identifier 306 determines whether the executable pages are associated with user ownership or kernel ownership. The example memory labeler 308 of FIG. 3 colors and/or otherwise labels the page as type "executable user space" or "kernel space" and stores such labels in the example cloning storage 324 for later referral.

The example OS identifier 312 of FIG. 3 examines the page(s) for one or more indications of OS related information, which may include information related to file names and their associated address(es). For example, page tables and/or frame tables of the Linux OS reveal names and corresponding address information related to files cached in memory. Generally speaking, a page/frame table is used by an OS to store mapping information linking virtual addresses to physical addresses. More specifically, some OSes employ and/or otherwise provide access to the frame table and, if so, the example frame table parser 314 parses the frame table to obtain memory space associations with corresponding file(s). Additionally, the example frame table parser 314 of FIG. 3 identifies whether one or more portions of memory/pages are used or free. In one example, the memory labeler 308 colors and/or otherwise labels the page with an indication of used or free, and/or labels the page with an indication of file association(s).

The example load balancer 206 of FIG. 2 monitors for one or more requests from the network 208 related to services desired by customers 210, 212 and/or users 214 (e.g., subscribers) of the customers 210, 212. The example demand manager 310 may receive and/or otherwise obtain information from the load balancer 206 that demand has increased and/or decreased. In the event that demand decreases, one or more cloned VMs may be relinquished by the example cloning manager 152. On the other hand, in response to retrieving and/or otherwise receiving an indication that demand increases, the example demand manager 310 of FIG. 3 allocates and/or otherwise generates one or more clone VM container(s). In the example of FIG. 3, each clone VM container is populated with metadata related to the state of the corresponding parent VM, such as example parent $VM_1$ 104 of FIG. 1B. As described above, the state of the corresponding parent VM CPU is likely to be the same or similar as a needed state invoked by increased user demand. By preconfiguring and/or otherwise forcing the state of a cloned VM, additional time is saved by reducing and/or eliminating one or more page faults related to establishing a CPU state of a newly invoked clone VM.

The one or more cloned VMs generated by the example demand manager 310 of FIG. 3 attempt to execute a processor instruction associated with the type of task it was chartered to handle. For example, if demand for services is related to OLAP, then the demand manager 310 assigns one or more cloned VMs to the request that have containers build based upon a parent VM associated with OLAP. The example fault trap 318 identifies circumstances where the allocated memory does not include corresponding information to allow the instruction to complete execution (e.g., additional needed code, file(s), user data, kernel data, free space for writing, etc.). For instance, in the example of FIG. 3 after example $VM_1$ 104 is generated, which includes a relatively small portion of allocated memory 168 (as compared to traditional memory allocations via VM instantiation), a fault is generated by $VM_1$ 104 if additional pages that are not present in the allocated memory 168 are needed to complete the instruction.

Prior to performing a fetch and/or one or more prefetches in response to the fault, the example instruction type identifier 320 of FIG. 3 determines if the faulted instruction is associated with a data fetch. If so, then the instruction type identifier 320 of FIG. 3 further narrows the type of data fetch as belonging to user space or kernel space. If the type of data fetch is for user space, then the prefetch manager 322 of the illustrated example constrains one or more prefetch operations to portions of memory/pages that have been colored and/or otherwise identified as user data. A benefit realized by fetching based on memory colorization as explained above is that the number of fetch operations is reduced or even minimized (e.g., due to fetching incorrect data/code) by constraining the prefetch operation(s) to portions of memory/pages that are related to the needed memory type. Similarly, if the type of data fetch is for kernel space, then the example prefetch manager 322 of FIG. 3 constrains one or more prefetch operations to portions of memory/pages that have been colored and/or otherwise identified as kernel data.

In the event that the example instruction type identifier 320 of FIG. 3 determines that the faulted instruction is not associated with a data fetch, then the instruction type identifier 320 of FIG. 3 determines whether the instruction is associated with code execution. If so, then the instruction type identifier 320 further narrows the type of code execution to either user code or kernel code. If the type of code execution is for user code, then the example prefetch manager 322 of FIG. 3 constrains one or more prefetch operations to portions of memory/pages that have been colored and/or otherwise identified as user code. On the other hand, if the instruction is associated with kernel code, then the example prefetch manager 322 constrains one or more prefetch operations to portions of memory/pages that have been colored and/or otherwise identified as kernel code.

In the event that the example instruction type identifier 320 of FIG. 3 determines that the faulted instruction is associated with free space, such as portion(s) of memory/pages that are not already consumed by kernel code, user code, kernel data, user data and/or one or more files, then the prefetch manager 322 of the illustrated example allocates portion(s) of memory/pages associated with free space. In some examples, the instruction identifies portions of memory/pages to which it can store data (e.g., configuration data, user specific data, computational memory, etc.).

While an example manner of implementing the example cloning manager 152 has been illustrated in FIGS. 1B, 2 and 3, one or more of the elements, processes and/or devices illustrated in FIGS. 1B, 2 and 3 may be combined, divided, re-arranged, omitted, eliminated and/or implemented in any other way. Further, the example cloning manager 152, the example memory copier 302, the example architecture identifier 304, the example memory type identifier 306, the example memory labeler 308, the example demand manager 310, the example OS identifier 312, the example frame table parser 314, the example fault trap 318, the example instruction type identifier 320, the example prefetch manager 322 and/or the example cloning storage 324 of FIGS. 1B, 2 and 3 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the apparatus or system claims of this patent are read to cover a purely software and/or firmware implementation, at least one of the example cloning manager 152, the example memory copier 302, the example architecture identifier 304, the example memory type identifier 306, the example memory labeler 308, the example demand manager 310, the example OS identifier 312, the example frame table parser 314, the example fault trap 318, the example instruction type identifier 320, the example prefetch manager 322 and/or the example cloning storage 324 of FIGS. 1B, 2 and 3 are hereby expressly defined to include a tangible computer readable medium such as a memory, DVD, CD, etc. storing the software and/or firmware. Further still, the example systems 150 and 300 of FIGS. 1B and 2 may include one or more elements, processes and/or devices in addition to, or instead of, those illustrated in FIGS. 1B, 2 and 3, and/or may include more than one of any or all of the illustrated elements, processes and devices.

Flowcharts representative of example machine readable instructions, which may be executed to implement the system 300 of FIG. 2 and/or the example cloning manager 152 of FIGS. 1B, 2 and 3 are shown in FIGS. 4-10. In these examples, the machine readable instructions comprise a program for execution by a processor such as the processor P105 shown in the example computer P100 discussed below in connection with FIG. 11. The program may be embodied in software stored on a tangible computer readable medium such as a CD-ROM, a floppy disk, a hard drive, a digital versatile disk (DVD), or a memory associated with the processor P105, but the entire program and/or parts thereof could alternatively be executed by a device other than the processor P105 and/or embodied in firmware or dedicated hardware. Further, although the example program is described with reference to the flowcharts illustrated in FIGS. 4-10, many other methods of implementing the example system 200 and/or the example cloning manager 152 may alternatively be used. For example, the order of execution of the blocks may be changed, and/or some of the blocks described may be changed, eliminated, or combined.

As mentioned above, the example processes of FIGS. 4-10 may be implemented using coded instructions (e.g., computer readable instructions) stored on a tangible computer readable medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of FIGS. 4-10 may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

Figure 4:
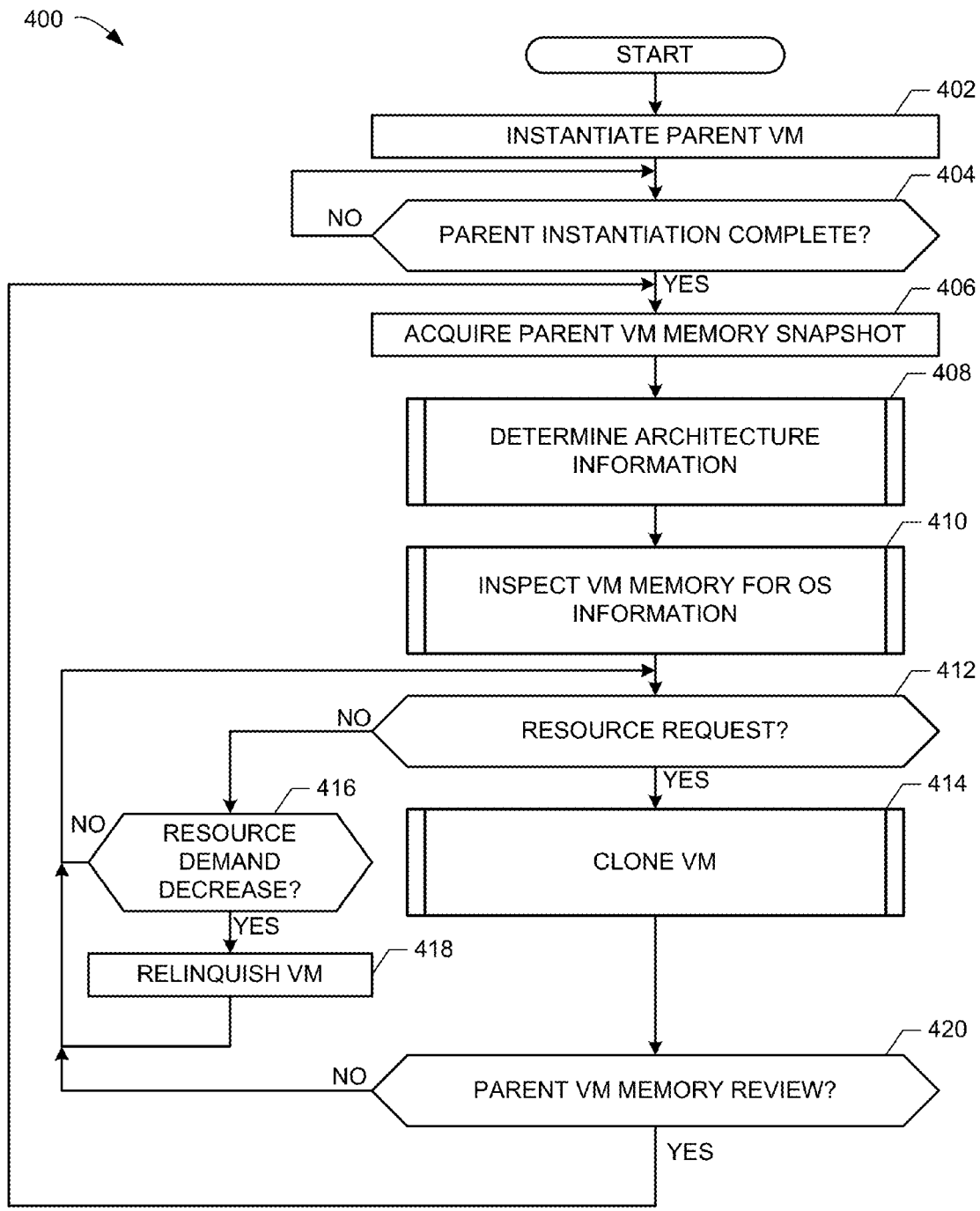
FIGS. 4-10 are flowcharts representative of example machine readable instructions that may be executed to implement the example systems of FIGS. 1B, 2 and/or the example cloning manager of FIGS. 1B, 2 and 3.

The program 400 of FIG. 4 begins at block 402 where the example VMM 102 instantiates a parent VM, such as the example parent $VM_1$ 104 of FIG. 1B. Any number of parent VMs may be instantiated by the example VMM 102. Such parent VMs may occur in response to one or more demands from customers and/or users. As described above, instantiation of VMs may require a relatively long period of time when compared to an amount of time such VMs actually execute after the instantiation process is complete. For example, instantiation of a parent VM may consume two minutes, yet such VM execution may only be needed for ten to fifteen seconds. Generally speaking, during the instantiation process, physical memory is allocated for use by the parent VM and is populated with pages associated with the instruction(s) of the task(s) assigned to the VM. Populating the allocated memory with pages includes reading such pages and/or files from disk, which exhibits access latencies that are substantially greater than access latencies associated with physical memory (e.g., RAM) and/or cache memory.

The example program 400 continues to wait for the parent VM to complete instantiation and/or for a threshold length of time thereafter sufficient to ensure the memory has been loaded by the parent VM (block 404) before the example memory copier 302 captures a copy of the physical memory 112 associated with the parent VM (block 406). As described in further detail below, the example architecture identifier 304 inspects the captured VM memory for architecture related information (block 408), which may reveal portions of memory/pages related to kernel code, kernel data, user code, and/or user data. The example OS identifier 312 also inspects the captured VM memory for information unique to the OS (block 410), which may reveal portions of memory/pages related to file names, corresponding file addresses and/or portions of memory that are free. Results from inspecting the memory for architecture related information (block 408) and information unique to the OS (block 410) are noted and/or otherwise tagged to the captured copy of physical memory 112 associated with the parent VM so that one or more fetch operation(s) may occur with respect to semantically-related regions of the memory relevant to an instruction executed by a clone VM, as described in further detail below.

In response to the example demand manager 310 detecting and/or otherwise receiving an indication that user demands are increasing (block 412) (e.g., via information received and/or otherwise retrieved from the example load balancer 206), one or more clone VMs are generated (block 414). On the other hand, in the event that the example demand manager 310 does not receive a request for resources of the underlying hardware from customers and/or users (block 412), then the demand manager 310 determines whether a demand for resources has decreased (block 416). If so, one or more previously cloned VMs may be relinquished (block 418) so that underlying resource(s) are available to the parent VM and/or one or more cloned VMs.

During operation, the memory of the parent VM, such as the example first sub-portion 162 used by $VM_1$ 104, may change. For example, portions of memory that were earlier identified as user code, user data, kernel code and/or kernel data may change. In other examples, portions of memory that were earlier identified as free space become consumed by data during execution of the parent VM. On a periodic, aperiodic, scheduled and/or manual basis, the example cloning manager 152 of the illustrated example invokes a parent VM memory reassessment (block 420), which returns the example program to block 406. As such, future attempts to fetch and/or prefetch memory/pages from the parent VM memory may occur more accurately, thereby resulting in a fewer number of page faults.

Figure 5:
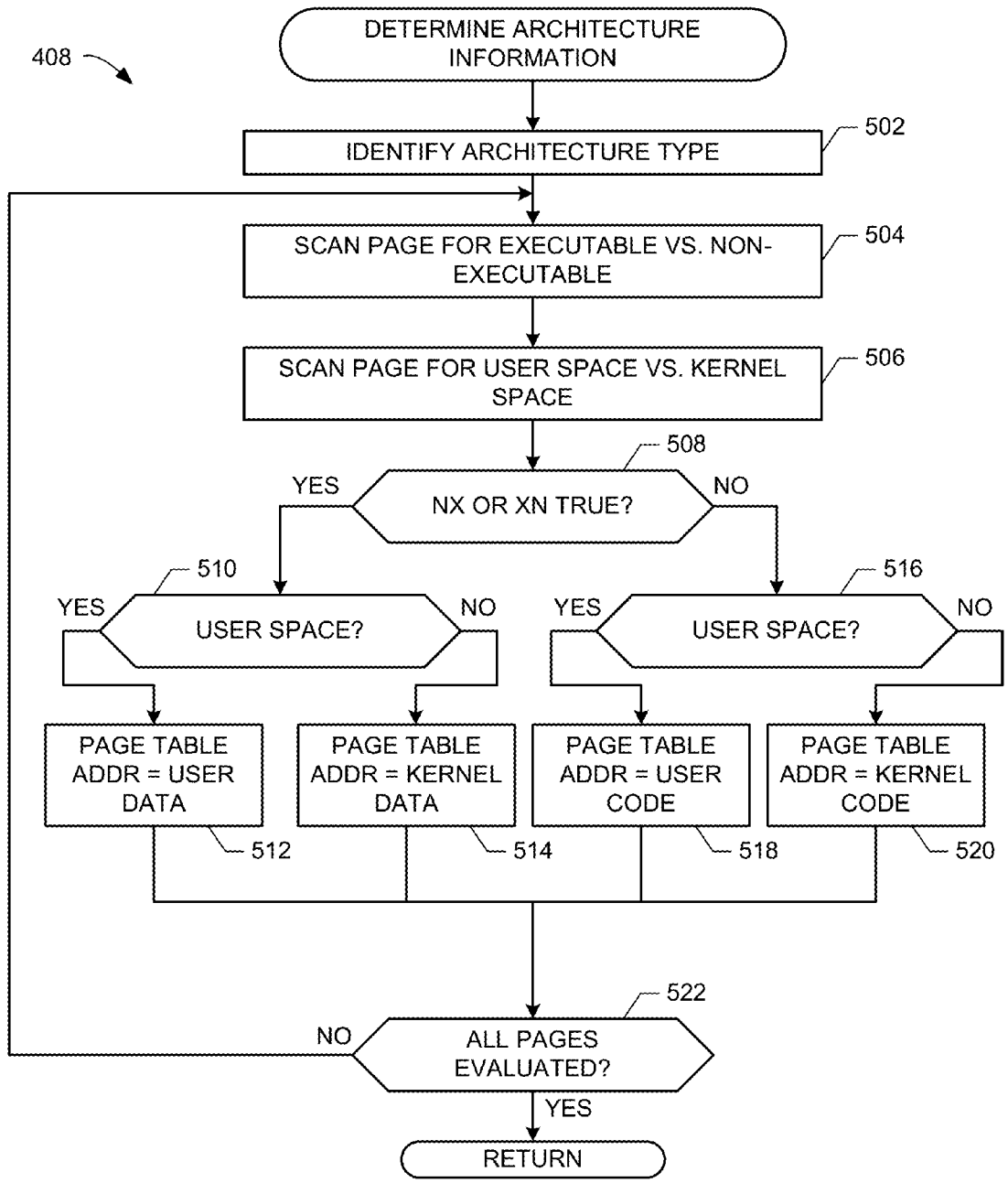

Turning to FIG. 5, the inspection of VM metadata for architecture related information (block 408) is illustrated in further detail. In the illustrated example of FIG. 5, the program 408 begins at block 502 where the example architecture identifier 304 of FIG. 3 examines the parent VM metadata to identify an architecture type of the CPU. For example, page table entries in some CPUs, such as x86 machines, may reveal information related to whether memory pages are executable or non-executable (e.g., code). Architecture types may include, but are not limited to x86 machines, ARM-based machines, 32-bit machines, 64-bit machines, etc. In some examples, NX/XN bits and/or kernel/user bits reside in one or more page table entries. Knowledge of the type of architecture may allow the example memory type identifier 306 to search for a correct type of architecture bit, such as an NX bit in case of an x86 architecture or an XN bit in case of an ARM architecture. Additionally, page table entries in some machines employ a user bit to distinguish user-related memory space from kernel-related memory space. In the event that a machine does not employ bits to reveal executable memory space and/or user memory space, a walk of the page table may be invoked by the example memory type identifier 306 to reconstruct a virtual address to reveal such information.

The memory type identifier 306 of the illustrated example scans the page table information for executable versus non-executable code by identifying a state of an NX bit or an XN bit (block 504). In the event the architecture is of type x86, then the example memory type identifier 306 scans and/or otherwise searches for the state of an NX bit. On the other hand, in the event the architecture is of type ARM, then the example memory type identifier 306 of FIG. 3 scans and/or otherwise searches the memory for the state of an XN bit. Additionally, the example memory type identifier 306 of the illustrated example scans the captured memory and/or page table addresses for a state of a user bit to reveal information indicative of whether the memory is associated with an OS kernel or user space (block 506).

The example memory type identifier 306 of the illustrated example determines whether the NX or XN bit is true (block 508). If the NX or XN bit is true, the example memory type identifier 306 of FIG. 3 determines whether the memory/page is associated with user space (block 510). If associated with user space, then the example memory labeler 308 labels and/or otherwise tags the captured memory as user data (block 512). If associated with kernel space (block 510), then the example memory labeler 308 labels and/or otherwise tags the captured memory as kernel data (block 514). In the event that the NX or XN bit is false (block 508), the example memory type identifier 306 of the illustrated example determines whether the memory/page is associated with user space (block 516). If associated with user space, then the example memory labeler 308 of the illustrated example labels and/or otherwise tags the captured memory as user code (block 518). Otherwise, the captured memory is labeled and/or otherwise tagged as kernel code (block 520). If all captured memory/pages have not been analyzed (block 522), control returns to block 504.

Figure 6:
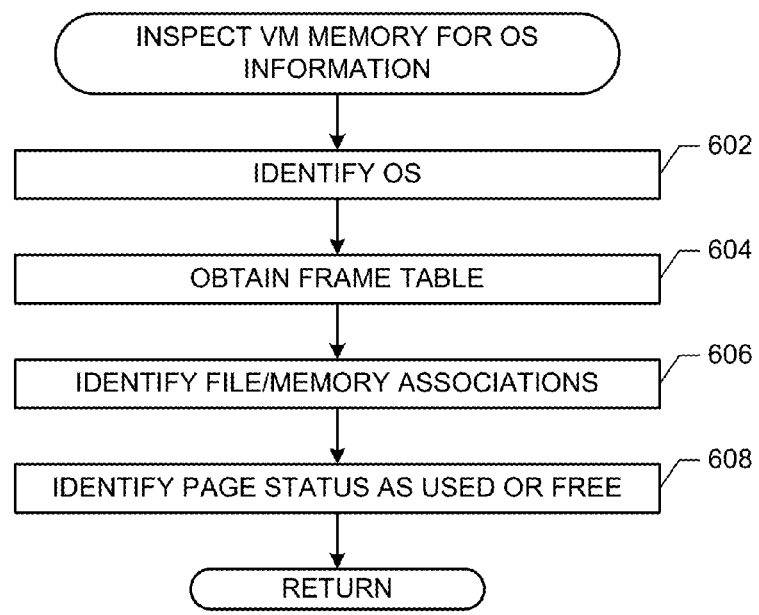

Turning to FIG. 6, the inspection of VM memory for OS related information (block 410) is illustrated in further detail. In the illustrated example of FIG. 6, the program 410 begins at block 602 where the example OS identifier 312 examines the pages/memory for one or more indications of OS related information. The example OS identifier 312 of the illustrated example determines whether the OS associated with the memory maintains one or more tables that may reveal additional information related to the composition of the memory. For example, both the Xen® VMM and the Linux® OS maintain a frame table that includes, in part, an array of records describing the properties of one or more pages. In some examples, the Xen® frame table entries indicate an owner VM and a number of page table mappings of a page across all VMs in a system. In other examples, a Linux® frame table entry may include page records that correspond to frames of memory that belong to a file and/or information of other pages that map to the same file. In still other examples, some OSes employ records that identify memory frames that correspond to system page cache.

The example frame table parser 314 of the illustrated example obtains a frame table from the captured memory (block 604) and reviews the frame table to identify one or more files and associated memory location(s) (block 606). Additionally, the example frame table parser 314 of the illustrated example reviews the frame table to identify address space(s) as used (e.g., storing user data, kernel data, user code, kernel code, file(s), etc.) or free (block 608).

Figure 7:
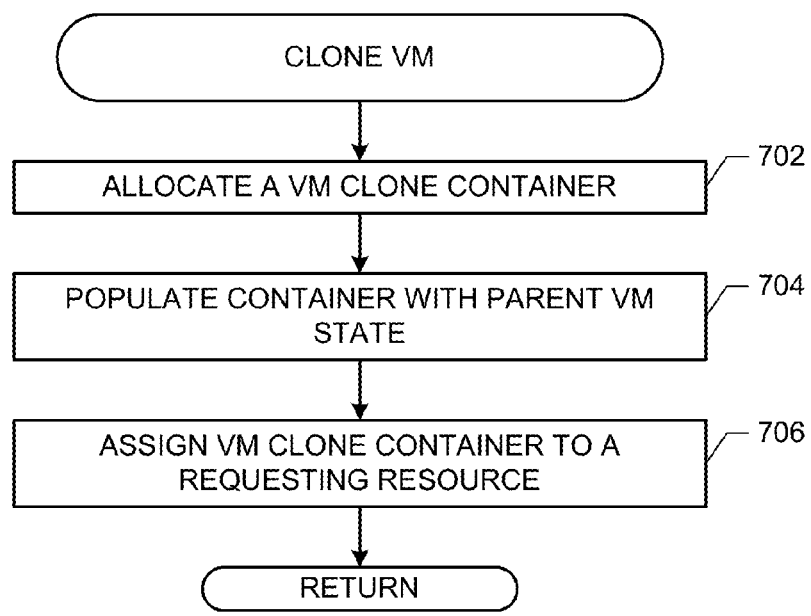

Turning to FIG. 7, the cloning of one or more VMs (block 414) is illustrated in further detail. In the illustrated example of FIG. 7, the program 414 begins at block 702 where the example demand manager 310 of FIG. 3 allocates a container for one or more new VMs. As described above, newly cloned VMs are not instantiated in the traditional manner, in which relatively large portions of memory are allocated to the VM for future use. Instead of merely saving the entire RAM of the parent VM to an allocated physical memory portion (e.g., a portion of RAM 112), the example demand manager 310 copies state information related to the parent VM in a container (e.g., a data table) as metadata (block 704). State information includes CPU state as well as address locations for information that is already cached by the parent VM, sometimes referred to as "warming" the VM. Each of the one or more clone VMs is assigned by the example demand manager 310 to one or more requesting process(es) (block 706).

Figure 8:
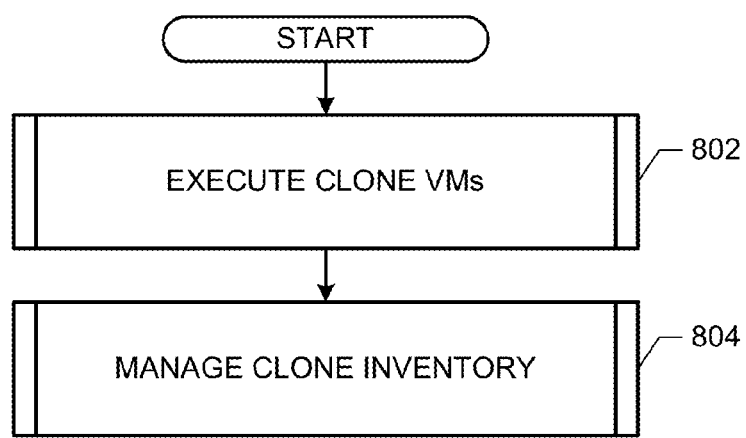

The program 800 of FIG. 8 begins at block 802 where clone VMs are executed. On a periodic, aperiodic, scheduled and/or manual basis, the example clone manager 152 of the illustrated example manages the clone inventory by removing and/or otherwise decommissioning cloned VMs that are no longer needed (block 804).

Figure 9:
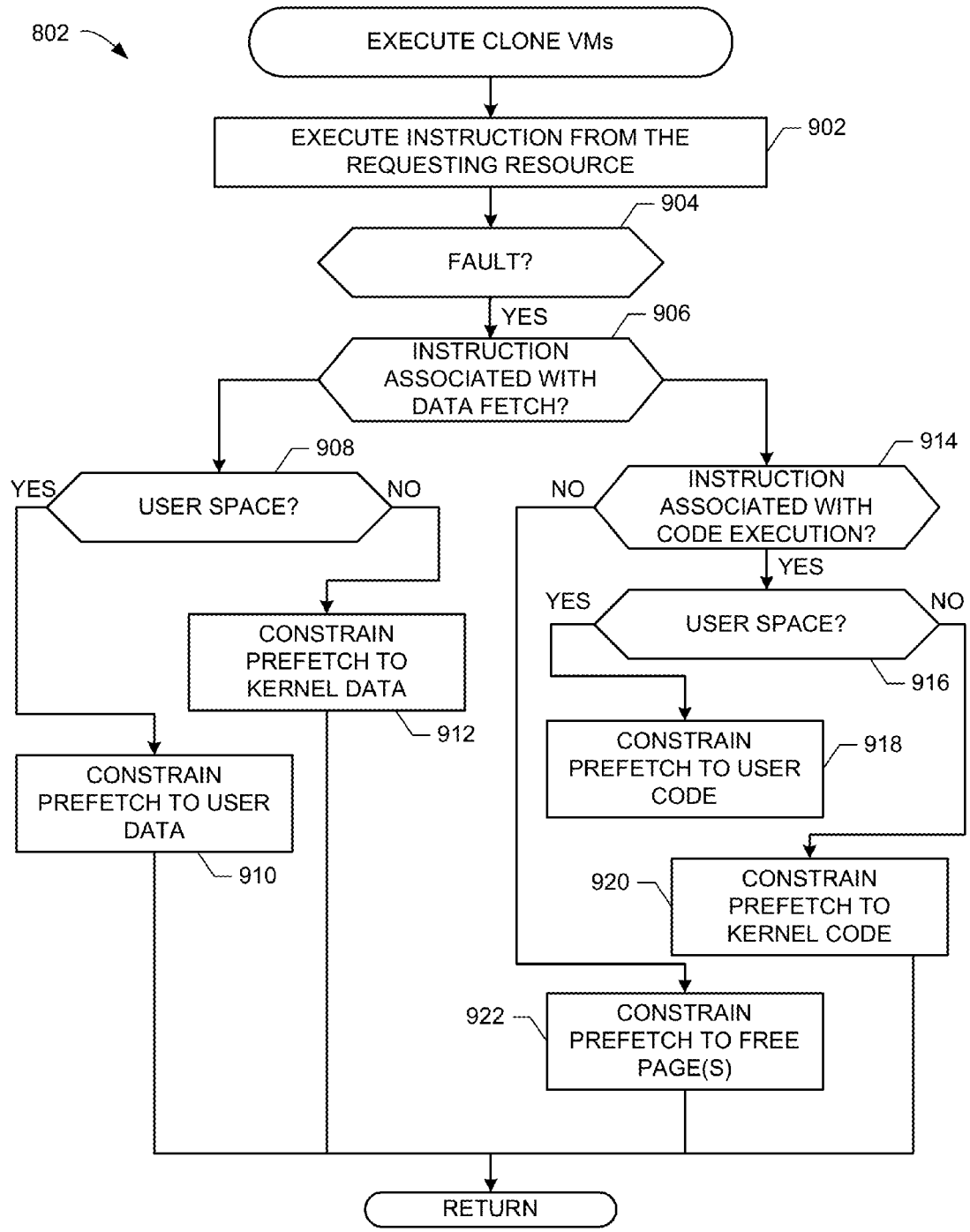

Turning to FIG. 9, an example execution of clone VMs (block 802) is illustrated in further detail. In the illustrated example of FIG. 9, the program 802 begins at block 902 where the example cloned VM (e.g., $VM_{CL1}$ 154 of FIG. 1B) executes an instruction associated with a desired task. The example fault trap 318 monitors the cloned $VM_{CL1}$ 154 for the occurrence of a page fault (block 904), which typically occurs whenever a VM begins execution. In particular, a newly executing VM typically does not have a populated cache memory with memory stored thereon, so an OS (e.g., via a VMM) invokes a fault handler to search for memory via a post page fault fetch. If the first fetch fails to retrieve the correct page(s) and/or other information stored in physical memory (e.g., RAM 112), then another fetch is invoked in an effort to obtain one or more correct pages/memory locations to satisfy the needs of the processor instruction(s). In response to detecting a fault (block 904), the example fault trap 318 of the illustrated example invokes the example instruction type identifier 320 to determine if the instruction is associated with a data fetch request(s) (block 906). If so, the example instruction type identifier 320 determines whether the instruction is indicative of user space (block 908) and, if so, the example prefetch manager 322 constrains the prefetch to one or more pages/memory location(s) identified as associated with user data (block 910).

As described above, the example memory labeler 308 of the illustrated example previously labeled and/or otherwise tagged the physical memory associated with the parent VM (e.g., $VM_1$ 162) with an indication of kernel data, user data, kernel code, user code, free space and/or one or more particular file(s). In view of the labeled/tagged physical memory, the example prefetch manager 322 performs one or more fetch operation(s) on the portion(s) of the physical memory that are associated with the clone VM instruction type, as identified by the example instruction type identifier 320. In the event that the example instruction type identifier 320 determines that the instruction is indicative of kernel space (block 908), then the example prefetch manager 322 constrains the prefetch to one or more pages/memory location(s) identified as associated with kernel data (block 912).

In the event that the example instruction type identifier 320 determines that the instruction is not associated with a data fetch (block 906), then the instruction type identifier 320 of the illustrated example determines whether the instruction is associated with code execution (block 914). If so, then the instruction type identifier 320 determines whether the instruction is associated with user space or kernel space (block 916). If the instruction is associated with user space, then the example prefetch manager 322 constrains the prefetch to one or more pages/memory location(s) identified as associated with user code (block 918), otherwise the prefetch manager 322 constrains the prefetch to one or more pages/memory location(s) identified as associated with kernel code (block 920). However, if the instruction type identifier 320 determines that the instruction is associated with neither a data fetch (block 906) nor code execution (block 914), then the instruction is deemed to be associated with a request to locate memory free space. As such, the example prefetch manager 322 constrains the prefetch to one or more pages/memory location(s) identified as free memory (block 922), which may later be used by the clone VM.

Figure 10:
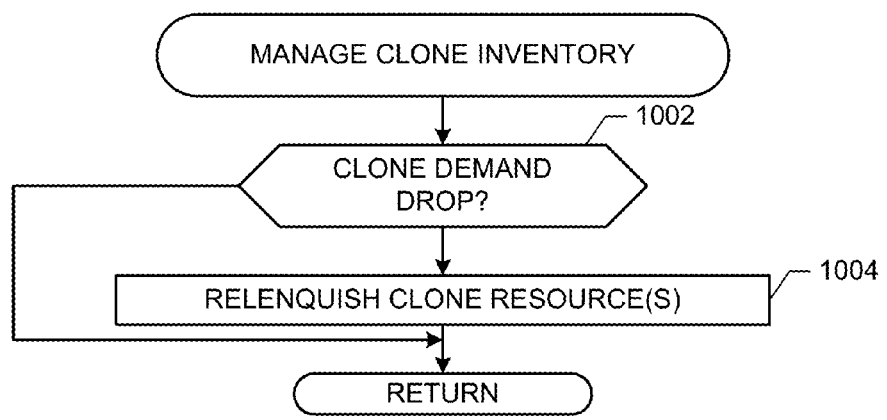

Turning to FIG. 10, the management of clone inventory (block 804) is illustrated in further detail. In the illustrated example of FIG. 10, the program 804 begins at block 1002 where the example demand manager 310 determines whether a demand for clones (resources) has decreased. In some examples, the demand manager 310 receives and/or otherwise retrieves an indication of requests from the example load balancer 206. If demand decreases (block 1002), then the example demand manager 310 of FIG. 3 relinquishes one or more cloned VMs (block 1004) so that their underlying hardware resources (e.g., RAM 112) may be utilized by one or more existing or future VMs.

Figure 11:
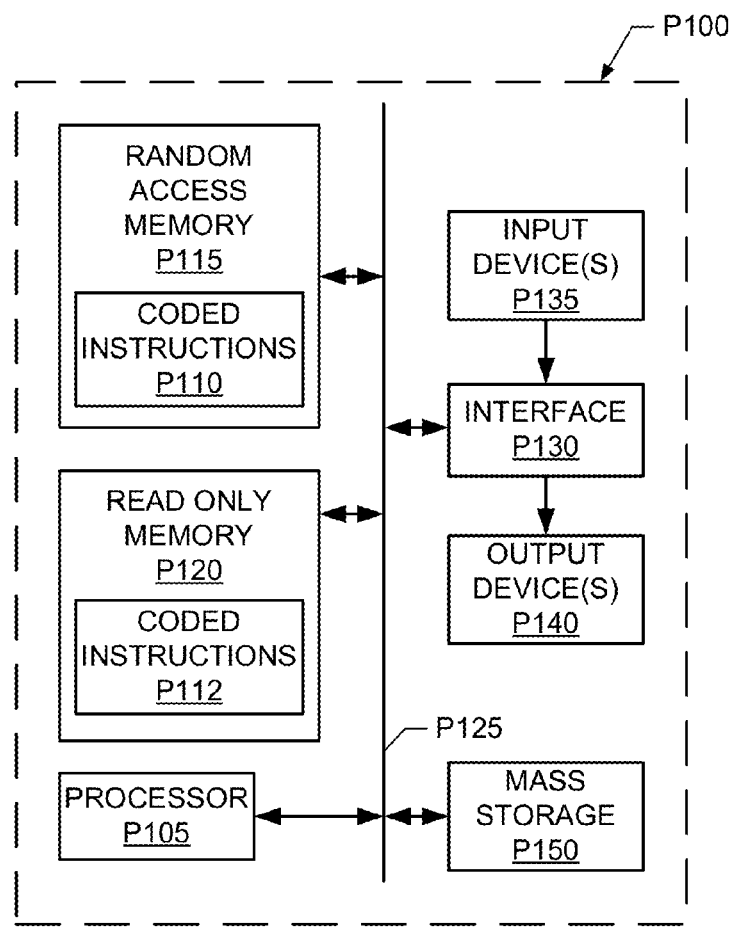
FIG. 11 illustrates an example processor platform that may execute the instructions of FIGS. 4-10 to implement any or all of the example methods, systems, and/or apparatus disclosed herein.

FIG. 11 is a block diagram of an example processing platform P100 capable of executing the instructions of FIGS. 4-10 to implement the example systems 150 and/or 200 and the cloning manager 152 of FIGS. 1B, 2 and 3. The processor platform P100 can be, for example, a server, a personal computer, or any other type of computing device.

The processor platform P100 of the instant example includes a processor P105. For example, the processor P105 can be implemented by one or more Intel® microprocessors. Of course, other processors from other families are also appropriate.

The processor P105 is in communication with a main memory including a volatile memory P115 and a non-volatile memory P120 via a bus P125. The volatile memory P115 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory P120 may be implemented by flash memory and/or any other desired type of memory device. Access to the main memory P115, P120 is typically controlled by a memory controller.

The processor platform P100 also includes an interface circuit P130. The interface circuit P130 may be implemented by any type of past, present or future interface standard, such as an Ethernet interface, a universal serial bus (USB), and/or a PCI express interface.

One or more input devices P135 are connected to the interface circuit P130. The input device(s) P135 permit a user to enter data and commands into the processor P105. The input device(s) can be implemented by, for example, a keyboard, a mouse, a touchscreen, a track-pad, a trackball, isopoint and/or a voice recognition system.

One or more output devices P140 are also connected to the interface circuit P130. The output devices P140 can be implemented, for example, by display devices (e.g., a liquid crystal display, and/or a cathode ray tube display (CRT)). The interface circuit P130, thus, typically includes a graphics driver card.

The interface circuit P130 also includes a communication device, such as a modem or network interface card to facilitate exchange of data with external computers via a network (e.g., an Ethernet connection, a digital subscriber line (DSL), a telephone line, coaxial cable, a cellular telephone system, etc.).

The processor platform P100 also includes one or more mass storage devices P150 for storing software and data. Examples of such mass storage devices P150 include floppy disk drives, hard drive disks, compact disk drives and digital versatile disk (DVD) drives.

The coded instructions of FIGS. 4-10 may be stored in the mass storage device P150, in the volatile memory P110, in the non-volatile memory P112, and/or on a removable storage medium such as a CD or DVD.

From the foregoing, it will be appreciated that disclosed example methods, apparatus, systems and/or articles of manufacture allow new cloned VMs to initialize substantially faster than traditionally invoked VMs, which in turn allows customers and/or users of cloud-based services to receive processing services in a more responsive manner. Additionally, because example methods, apparatus, systems and/or articles of manufacture disclosed herein prevent one or more fetching and/or prefetching operations from occurring on pages of memory unrelated to a requesting processor instruction, a fewer number of iterative fetching and/or page faults occur.

Although certain example methods, apparatus, systems and articles of manufacture have been described herein, the scope of coverage of this patent is not limited thereto. On the contrary, this patent covers all methods, apparatus, systems and articles of manufacture fairly falling within the scope of the claims of this patent.

What is claimed is:

1. A method comprising:
   instantiating, by a processor that executes a virtual machine manager, a first virtual machine, wherein instantiating the first virtual machine comprises allocating memory and populating the memory with pages that indicate tasks assigned to the first virtual machine;
   in response to a determination that the first virtual machine is instantiated, capturing, by the processor, a copy of the memory;
   inspecting, by the processor, metadata associated with the copy of the memory for architecture information that indicates
      a memory architecture type of the first virtual machine based upon a central processing unit architecture of the first virtual machine,
      a first portion of the memory that is related to kernel code, and
      a second portion of the memory that is related to user code;
   inspecting, by the processor, the metadata associated with the copy of the memory for operating system information that indicates
      an operating system of the first virtual machine,
      a third portion of the memory that is related to file names,
      a fourth portion of the memory that is related to file addresses, and
      a fifth portion of the memory that is free;
   tagging, by the processor, the copy of the memory with the architecture information and the operating system information;
   in response to receiving an indication that a demand for the first virtual machine has increased, generating, by the processor, a clone of the first virtual machine; and
   fetching, based on the tagging, by the processor, a relevant portion of the memory that is semantically related to an instruction executed by the clone of the first virtual machine.

2. The method of claim 1, wherein inspecting the metadata associated with the copy of the memory for the architecture information further comprises determining the central processing unit architecture associated with the first virtual machine.

3. The method of claim 2, further comprising:
   in response to a determination that the central processing unit architecture comprises an x86 architecture, scanning page table information for executable code and non-executable code by identifying a state of an NX bit.

4. The method of claim 2, further comprising:
   in response to a determination that the central processing unit architecture comprises an ARM architecture, scanning page table information for executable code and non-executable code by identifying a state of an XN bit.

5. The method of claim 1, wherein inspecting the metadata associated with the copy of the memory for the architecture information comprises:
   scanning page table information for executable code and non-executable code by identifying a state of an XN bit or an NX bit.

6. The method of claim 5, further comprising:
   in response to determining that the state is true,
      determining that a portion of the copy of the memory associated with the XN bit or the NX bit corresponds to user space, and
      tagging the portion of the copy of the memory as the user space.

7. The method of claim 1, wherein inspecting the metadata associated with the copy of the memory for the operating system information comprises:
   obtaining a frame table maintained by the operating system, the frame table being obtained from the copy of the memory;
   identifying, based on a review of the frame table, a file, an associated memory location, and an address space.

8. A system comprising:
   a processor; and
   a memory that stores instructions that, when executed by the processor, cause the processor to perform operations comprising
      instantiating a first virtual machine, wherein instantiating the first virtual machine comprises allocating physical memory and populating the physical memory with pages that indicate tasks assigned to the first virtual machine,
      in response to a determination that the first virtual machine is instantiated, capturing a copy of the physical memory,
      inspecting, by the processor, metadata associated with the copy of the physical memory for architecture information that indicates
         a memory architecture type of the first virtual machine based upon a central processing unit architecture of the first virtual machine,
         a first portion of the physical memory that is related to kernel code, and
         a second portion of the physical memory that is related to user code,
      inspecting, by the processor, the metadata associated with the copy of the physical memory for operating system information that indicates
         an operating system of the first virtual machine,
         a third portion of the physical memory that is related to file names,
         a fourth portion of the physical memory that is related to file addresses, and
         a fifth portion of the physical memory that is free,
      tagging, by the processor, the copy of the physical memory with the architecture information and the operating system information,
      in response to receiving an indication that a demand for the first virtual machine has increased, generating, by the processor, a clone of the first virtual machine, and
      fetching, based on the tagging, by the processor, a relevant portion of the physical memory that is semantically related to an instruction executed by the clone of the first virtual machine.

9. The system of claim 8, wherein inspecting the metadata associated with the copy of the physical memory for the architecture information further comprises determining the central processing unit architecture associated with the first virtual machine.

10. The system of claim 9, wherein the instructions, when executed by the processor, cause the processor to perform operations further comprising:

in response to a determination that the central processing unit architecture comprises an x86 architecture, scanning page table information for executable code and non-executable code by identifying a state of an NX bit.

11. The system of claim 9, wherein the instructions, when executed by the processor, cause the processor to perform operations further comprising:
in response to a determination that the central processing unit architecture comprises an ARM architecture, scanning page table information for executable code and non-executable code by identifying a state of an XN bit.

12. The system of claim 8, wherein inspecting the metadata associated with the copy of the physical memory for the architecture information comprises:
scanning page table information for executable code and non-executable code by identifying a state of an XN bit or an NX bit.

13. The system of claim 12, wherein the instructions, when executed by the processor, cause the processor to perform operations further comprising:
in response to determining that the state is true,
determining that a portion of the copy of the memory associated with the XN bit or the NX bit corresponds to user space, and
tagging the portion of the copy of the memory as the user space.

14. The system of claim 8, wherein inspecting the metadata associated with the copy of the physical memory for the operating system information comprises:
obtaining a frame table maintained by the operating system, the frame table being obtained from the copy of the physical memory;
identifying, based on a review of the frame table, a file, an associated memory location, and an address space.

15. A non-transitory computer readable medium having instructions stored thereon that, when executed by a processor, cause the processor to perform operations comprising:
instantiating a first virtual machine, wherein instantiating the first virtual machine comprises allocating physical memory and populating the physical memory with pages that indicate tasks assigned to the first virtual machine;
in response to a determination that the first virtual machine is instantiated, capturing a copy of the physical memory;
inspecting, by the processor, metadata associated with the copy of the physical memory for architecture information that indicates
a memory architecture type of the first virtual machine based upon a central processing unit architecture of the first virtual machine,
a first portion of the physical memory that is related to kernel code, and
a second portion of the physical memory that is related to user code;
inspecting, by the processor, the metadata associated with the copy of the physical memory for operating system information that indicates
an operating system of the first virtual machine,
a third portion of the physical memory that is related to file names,
a fourth portion of the physical memory that is related to file addresses, and
a fifth portion of the physical memory that is free;
tagging, by the processor, the copy of the physical memory with the architecture information and the operating system information;
in response to receiving an indication that a demand for the first virtual machine has increased, generating, by the processor, a clone of the first virtual machine; and
fetching, based on the tagging, by the processor, a relevant portion of the physical memory that is semantically related to an instruction executed by the clone of the first virtual machine.

16. The non-transitory computer readable medium of claim 15, wherein inspecting the metadata associated with the copy of the physical memory for the architecture information further comprises determining the central processing unit architecture associated with the first virtual machine.

17. The non-transitory computer readable medium of claim 16, wherein the instructions, when executed by the processor, cause the processor to perform operations further comprising:
in response to a determination that the central processing unit architecture comprises an x86 architecture, scanning page table information for executable code and non-executable code by identifying a state of an NX bit.

18. The non-transitory computer readable medium of claim 16, wherein the instructions, when executed by the processor, cause the processor to perform operations further comprising:
in response to a determination that the central processing unit architecture comprises an ARM architecture, scanning page table information for executable code and non-executable code by identifying a state of an XN bit.

19. The non-transitory computer readable medium of claim 15, wherein inspecting the metadata associated with the copy of the physical memory for the architecture information comprises:
scanning page table information for executable code and non-executable code by identifying a state of an XN bit or an NX bit; and
in response to determining that the state is true,
determining that a portion of the copy of the memory associated with the XN bit or the NX bit corresponds to user space, and
tagging the portion of the copy of the memory as the user space.

20. The non-transitory computer readable medium of claim 15, wherein inspecting the metadata associated with the copy of the physical memory for the operating system information comprises:
obtaining a frame table maintained by the operating system, the frame table being obtained from the copy of the physical memory;
identifying, based on a review of the frame table, a file, an associated memory location, and an address space.

* * * * *